Aug. 27, 1929.        J. EATON        1,726,478
CONTROL OF MULTISPEED MOTORS
Filed Sept. 10, 1924
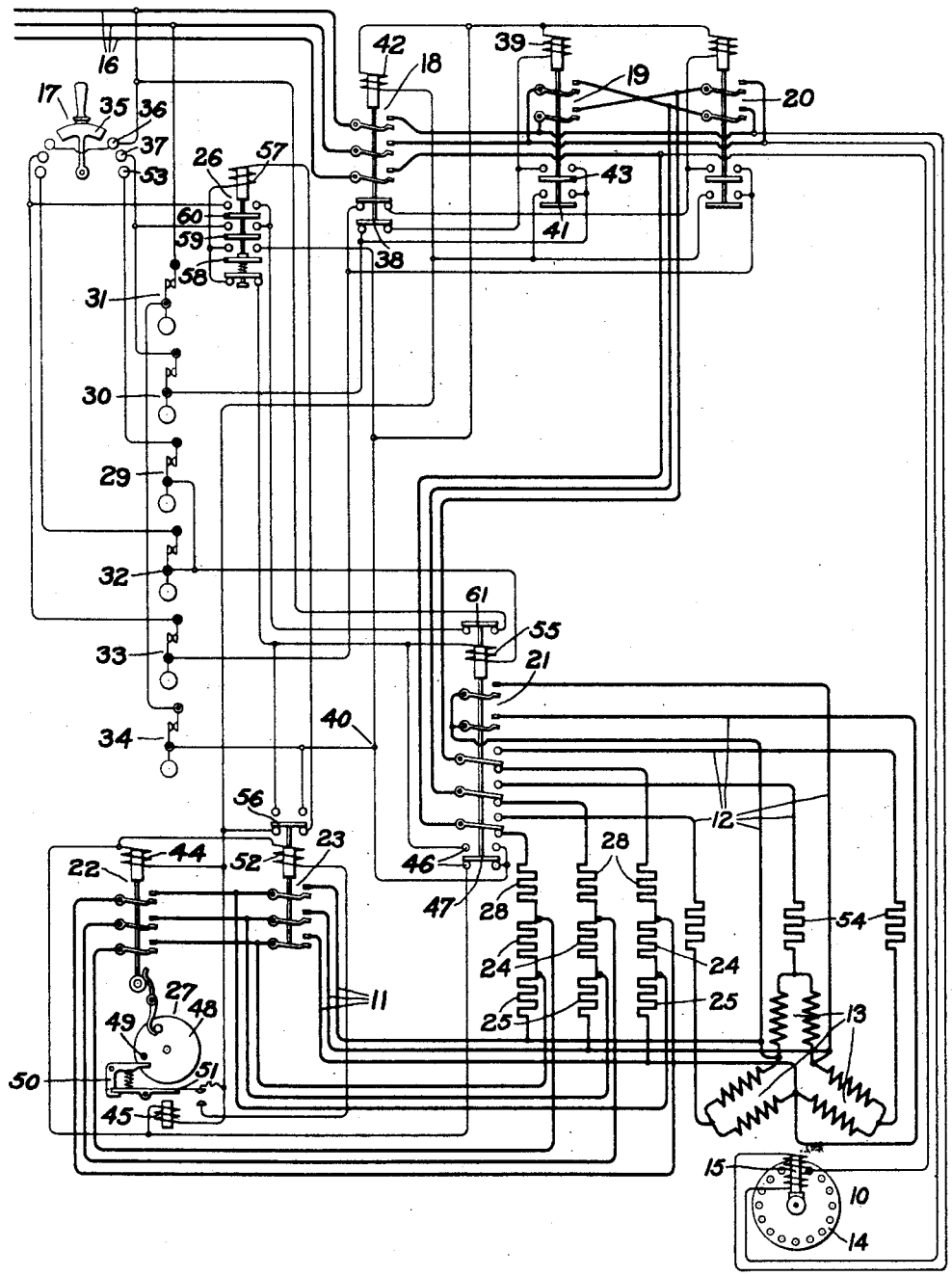
Inventor:
John Eaton,
by *Alexander F. Lund*
His Attorney.

Patented Aug. 27, 1929.

1,726,478

UNITED STATES PATENT OFFICE.

JOHN EATON, OF SCHENECTADY, NEW YORK, ASSIGNOR TO GENERAL ELECTRIC COMPANY, A CORPORATION OF NEW YORK.

CONTROL OF MULTISPEED MOTORS.

Application filed September 10, 1924. Serial No. 736,984.

This invention relates to the control of multispeed electric motors and it has particular reference to the control of alternating current motors of the induction type having slow and high speed connections and adapted for elevator or hoisting service or the like.

The invention has for its principal object the provision of a simple, safe and reliable control system whereby a multispeed motor of the above character may be started, stopped, and operated at each of its several speeds as well as automatically slowed down to its lowest operating speed after operation at a higher speed.

More specifically, the invention provides a novel arrangement of control apparatus and circuits whereby an alternating current induction motor having slow and high speed connections may be connected at will to a source of power for slow and high speed operation and it is insured that the motor shall be retarded to its lowest operating speed preparatory to stopping after high speed operation by automatically establishing the slow speed power connections of the motor for a predetermined time interval. The control arrangement also provides for entirely disconnecting the motor from the source of power in case of failure of the control apparatus to establish the automatic slow down power connections, under abnormal operating conditions.

The invention is of particular utility when applied to the control of a multispeed induction motor which is employed in elevator or hoisting service or the like where it is desirable that the motor be brought to a slow operating speed before the power connections are interrupted and the friction brakes are applied to stop the elevator car or other apparatus driven by the motor. In such service a control system embodying my invention not only avoids subjecting the motor and apparatus driven thereby to the heavy shocks and strains which would be occasioned by an application of the brakes with the motor running at high speed but also greatly lessens the duty and consequently the wear and deterioration of the brakes. Furthermore, a control system arranged according to my invention effects a smooth and gradual deceleration of the motor under all normal operating conditions and effectively prevents a careless or impetuous operator from suddenly stopping or reversing the motor.

In order to effect the automatic slow down of a multispeed elevator motor according to the preferred form of my invention, I provide an electroresponsive switch or relay which is connected to be energized during the high speed operation of the motor and is arranged to establish automatically the slow speed power connections of the motor upon the interruption of the high speed connections. Cooperating with the electroresponsive relay, I provide a time delay device which is arranged to be set into operation upon the automatic establishment of the slow speed power connection of the motor to effect the interruption of the same after a predetermined time interval. Thus the motor is automatically slowed down to its lowest speed and then disconnected from the source of power independently of the control of the operator.

For a more complete understanding of the nature and objects of the present invention reference may be had to the following description taken in connection with the accompanying drawing which diagrammatically illustrates an elevator control system embodying the invention for the purpose of explaining the principles thereof.

The several novel features and combinations which I believe to be characteristic of my invention are set forth with particularity in the appended claims.

Referring to the drawing, 10 represents an alternating current multispeed induction motor of the three phase squirrel cage type having slow speed connections 11 and high speed connections 12 for the stator or primary windings 13. As is well understood in the art, the stator windings 13 are arranged in such a manner as to produce different numbers of poles and thereby operate the squirrel cage rotor 14 at different speeds when suitable power connections are established with the slow and high speed connections 11 and 12 respectively. For example, the windings 13 may be arranged to produce 16 poles upon the establishment of the slow speed power connections and 8 poles upon the establishment of the high speed power connections, these particular pole numbers being well suited for a multispeed induction motor employed in elevator service and designed for operation with an ordinary commercial 60 cycle source of power.

The particular arrangement of the windings 13 to obtain the several different pole numbers forms no part of my present invention and my novel system may be employed with equal facility to control multispeed motors having other types of windings than that illustrated.

In the elevator control system shown in the drawing it will be understood that the rotor 14 of motor 10 is mechanically connected through suitable gearing, not shown, to raise and lower an elevator car. The motor 10 is provided with an ordinary electromagnetic brake 15 which is of the three phase type as shown and is biased to engage with a suitable friction drum mounted on the motor shaft in order to stop and maintain the elevator at rest when the motor 10 is deenergized.

Power is supplied to the motor 10 through the supply lines 16 which are arranged to be energized from a suitable source of power not shown in the drawing and the starting and stopping of the motor as well as the operation thereof at slow and high speed in either direction is controlled at will by means of the master switch mechanism or controller 17 and the electromagnetic switch mechanism cooperating therewith comprising the line switch 18, the reversing switch 19 and 20, the speed selective switch 21 and the switches 22 and 23 which are connected to control the motor current regulating resistors 24 and 25 respectively.

In order to effect the slow down of the motor by automatically establishing the slow speed power connections for a predetermined time interval after operation thereof at high speed, the electroresponsive relay 26 together with the time delay device 27 are provided and arranged in cooperating relation with the controller 17 and the electromagnetic switch mechanism controlled thereby in a manner which will be more fully set forth in connection with the description of the operation of the invention.

The time delay device 27 not only serves to effect the automatic slow down of the motor but also functions during manual control of the motor by the controller 17 to delay the operation of the resistance controlling switch 23 to the closed position for a predetermined time interval after the energization and operation of the switch 22. As shown in the drawing, the time delay device 27 is of the fly wheel inertia type described and claimed in Patent No. 1,499,178, McLain, issued June 24, 1924, to which reference may be had for an understanding of the principles of construction and operation of the device. My present invention, however, is not limited to the use of this particular type of time delay device and other types of time delay devices may be employed if desired.

It will be observed that the speed selective switch 21 is arranged to control the slow and high speed connections of the motor 10 and is shown in its biased position wherein the slow speed connections of the motor are established with the current regulating resistors 24, 25, and 28 in circuit therewith. The line switch 18 and the reversing switches 19 and 20 are biased to the open positions in which they are shown and are arranged to cooperate with the selective switch 21 in establishing the slow and high speed power connections for the motor when operated to their respective closed positions.

To effect the automatic stopping of the driving motor 10 when the elevator car approaches its upper or lower limits of travel, the up slow down switch 29, the up limit switch 30, and the up over travel switch 31 together with the corresponding down slow down, limit, and over travel switches 32, 33, and 34 are arranged on proper spaced relation in the elevator shaft so as to be mechanically opened upon engagement with a suitable tripping finger carried by the elevator car. The construction and arrangement of these switches in the elevator shaft is well known to those skilled in the elevator control art. Likewise, altho not shown in the drawing, it will be understood that the usual safety gate switches, together with a governor switch, a slack cable switch, and an overload relay may be provided and connected in the customary manner in the motor control circuits to afford safety protection for the elevator and the driving motor 10.

The purpose and arrangement of the several circuits controlled by the electroresponsive relay 26 as well as those controlled by the auxiliary switch mechanism with which the respective electromagnetic switches 18, 19, 20, 21, and 23 are provided will be more clearly understood from a description of the operation of the elevator control system embodying my invention which is as follows;

With the three phase supply lines 16 energized from a suitable source of power, the motor 10 may be started to operate the elevator in a direction, which may be assumed to be the up direction, by moving the handle of the controller 17 from the off position in which it is shown to the right into its first operative position in which the bridging contact 35 is brought into engagement with the stationary contacts 36 and 37. This establishes an energizing circuit for the up reversing switch 19 which may be traced from the upper supply line through the contacts 35, 36 and 37, of the controller 17, the up limit switch 30, the auxiliary contact 38 of the line switch 18, the operating winding 39 of the up reversing switch 19, and thence through the conductor 40, the down over travel switch 34, and the up over travel switch 31 to the middle supply line. Upon the resulting operation of up reversing switch 19 to the closed position, the auxiliary contact 41 thereof is closed to energize the operating winding 42 of line switch 18 by connecting the same in a parallel circuit with the operating winding 39. The line switch 18 at once closes and completes the slow speed power connections of the motor 10.

It should be noted that altho the auxiliary contact 38, through which the energizing circuit of switch 19 was established, is operated to the open position upon the closure of line switch 18, nevertheless the switch 19 is maintained closed since a holding circuit for the operating winding thereof was established in shunt with the contact 38 by the auxiliary contact 43 of switch 19 upon the operation of the latter to the closed position.

Upon the completion of the slow speed power connections of the motor from the supply lines 16 through the line switch 18, the up reversing switch 19, the selective switch 21, and the current regulating resistors 28, 24 and 25, the electromagnetic brake 15 is released and the motor 10 at once starts to drive the elevator in the up direction. At the same time, the operating winding 44 of the resistance controlling switch 22 and the operating winding 45 of the time delay device 27 are energized simultaneously through a circuit which may be traced from the upper supply line, through the contacts 35, 36 and 37 of controller 17, the switch 30, the auxiliary contact 41 of switch 19, the windings 44 and 45 in parallel circuit, the lower auxiliary contacts 46 and 47 of selective switch 21, and thence through the conductor 40 and the switches 34 and 31 to the middle supply line. Switch 22 at once responds and closes its contacts to short circuit the resistors 24 and permit an increased flow of current from the supply lines 16 to the primary windings 13 of motor 10, thereby causing the latter to accelerate the elevator car. In closing, the switch 22 sets the fly wheel 48 of the time delay device 27 into operation and after a predetermined time interval the tripping pin 49 is carried into engagement with the latch 50, thus releasing the contact arm 51. Due to the energization of the winding 45 in the manner previously described, the contact arm 51 is operated at once to the closed position and connects the operating winding 52 of switch 23 in parallel circuit with the operating windings 44 and 45. Thereupon the switch 23 responds to short circuit the resistors 25 and thereby further accelerate the motor 10 to its normal slow speed.

Should the operator now move the handle of controller 17 to engage the bridging contact 35 with the stationary contact 53, the selective switch 21 will be operated to establish the high speed power connections of the motor 10 with the high speed current regulating resistors 54 in circuit therewith. The energizing circuit for the operating winding 55 of selective switch 21 extends from the upper supply line through the controller contacts 35, 36 and 53, the switch 29, the winding 55, the auxiliary contact 56 of switch 23 in its upper position and the switches 34 and 31 to the middle supply line. During the operation of switch 21 to its upper position, a holding circuit for the operating winding 55 thereof is established in shunt with the contact 56 upon the engagement of the upper of the contacts 46 by the contact 47 with which the switch 21 is provided and the lower of the contacts 46 are disengaged, thus interrupting the energizing circuit of switches 22 and 23 and the time delay device 27 each of which thereupon returns to its biased position as shown in the drawing.

Upon the establishment of the high speed power connections, the motor 10 accelerates the elevator to its highest operating speed, the regulating resistors 54 serving to limit the current taken by the motor within a safe value as well as to effect a smooth and gradual acceleration thereof. At the same time, the relay 26 is energized through a circuit extending from the upper supply line through the controller contacts 35, 36, and 37, the switch 30, the auxiliary contact 41 of switch 19, the auxiliary contact 56 of switch 23 in its lower position, the operating winding 57 of relay 26, the lower of the overlapping contacts 58 with which the relay 26 is provided, the auxiliary contact 47 of switch 21 in its upper position and thence through the conductor 40 and the switches 34 and 31 to the middle supply line. When the relay 26 responds, a holding circuit for the operating winding thereof is established in shunt with the lower contact 58 and the contact 47 of switch 21 through the upper overlapping contact 58 which is arranged in a well known manner to close before the lower contact 58 opens. The auxiliary contacts 59 and 60 of the relay 26 are also closed at this time and the former establishes connections through which the line switch 18 and the reversing switch 19 are maintained energized independently of the controller 17 as will more clearly appear from the following description of the operation of my novel control system in automatically slowing down the motor 10.

Altho it will be evident that the slow speed power connections of the motor may be established after high speed operation thereof by simply returning the controller 17 to the position in which the bridging contact 36 again engages only the stationary contacts 35 and 36, let us assume that a careless or impetuous operator throws the controller handle from the high speed up position at once to the off position or even to one of the opposite operating positions. Upon the disengagement of the bridging contact 35 from the stationary contact 53, the energizing circuit of the operating winding 55 is interrupted and the selective switch 21 returns to its biased position, thus reestablishing the slow speed power connections of motor 10. The auxiliary contact 61 of switch 21 also is closed and completes the independent energizing circuit through the auxiliary contact 59 of relay 26 for the line switch 18 and the reversing switch 19. This circuit may be traced from the upper supply line directly through the contact 61, the contact 59, the switch 30 and thence through the contacts 41 and 43 and the operating windings 42 and 39 in parallel circuits, the conductor 40 and the switches 34 and 31 to the middle supply line. Thus it will be seen that the line and reversing switches are maintained closed to establish the slow speed power connections of the motor independently of the further operation of controller 17 to the off or the opposite operating positions. It should be noted, however, that if the selective switch 21 fails to establish the slow speed connections of motor 10 due to freezing of the high speed contacts, a ground in the control circuit of the operating winding 55, or other abnormal conditions the line switch 18 and the reversing switch 19 will be deenergized immediately upon the operation of controller 17 to the off position since under these abnormal conditions, the independent energizing circuit is not completed through the auxiliary contact 61 of selective switch 21. This feature of my invention insures that the driving motor of the elevator is disconnected from the source of power and the electromagnetic brake 15 is applied to bring the elevator to a stop upon the failure of the selective switch 21 to establish the low speed power connections.

However, when the selective switch 21 properly functions to interrupt the high speed power connections the establishment of the slow speed power connections with the motor running at high speed produces a braking action which gradually and smoothly decelerates the elevator car, the current regulating resistors 24, 25 and 28 serving to maintain the initial braking action within desirable limits.

It will be observed that the relay 26 is maintained energized independently of the controller 17 through a circuit extending from the upper supply line through the contact 61, the contact 59, the switch 30, the contact 41, the contact 56 the operating winding 57, the upper overlapping contact 58, the conductor 40 and the switches 34 and 31 to the middle supply line. Hence the operation of the line switch 18 and the reversing switch 19 to interrupt the automatic slow down operation of motor 10 is dependent upon the opening of the auxiliary contact 56 of the resistance controlling switch 23 and the operation of the latter switch is under the control of the time delay device 27.

When the switch 21 returns to its biased position shown in the drawing to establish the automatic slow speed power connections of the motor, the auxiliary contact 47 thereof reengages the lower contacts 46 and closes an energizing circuit for the operating winding 44 of switch 22 and the operating winding 45 of the time delay device 27, in parallel circuit with the operating winding of the line switch 18. Thereupon the switch 22 operates to short circuit the resistors 24 and the time delay device is set into operation to close the switch 23 after a predetermined time interval in the same manner as previously described in connection with the slow speed operation of the motor.

During the predetermined time interval required for the operation of the time delay device 27, the braking action exerted by the motor 10 effects the deceleration of the elevator to substantially its lowest operating speed. Thereupon the contacts of the time delay device are finally closed and the resulting operation of switch 23 to open its auxiliary contact 56 interrupts the energizing circuit of the relay 26. The relay at once returns to its biased position shown in the drawing and the energizing circuit of the line switch 18 as well as that of reversing switch 19 is interrupted by the opening of the relay contact 59. Switches 18 and 19 at once open according to their bias and interrupt the slow speed power connections of motor 10 and at the same time deenergize the electromagnetic brake 15. The brake then brings the motor and the elevator driven thereby to rest.

From the foregoing it will be evident that my invention effects the automatic slow down of the motor 10 in a simple, efficient, and reliable manner even though the controller 17 should be thrown from either high speed position directly to the off position. If the controller is thrown from the up high speed position directly to the down slow speed position, the motor 10, after automatically slowing down as previously described, will be connected to the supply lines 16 for slow speed operation in the opposite direction through the reversing switch 20 in a similar manner to that previously described in connection with reversing switch 19. Likewise the establishment of the down high speed power connections of the motor as well as the automatic slow down of the motor in the down direction are effected in a manner similar to that previously described. My invention, however is not limited to the control of a reversible multispeed motor but may be applied to automatically slow down a motor which is always operated in the same direction.

The automatic control of motor 10 by the several limit switches to prevent overrunning the limits of travel of the elevator forms no part of my present invention and will be evident to those skilled in the art. Likewise it will be understood that the invention may be carried into effect in a push button elevator control system if desired.

In accordance with the provisions of the patent statutes, I have described the principle of operation of my invention, together with the apparatus which I now consider to represent the best embodiment thereof, but I desire to have it understood that the apparatus shown is only illustrative, and that the invention may be carried out by other means.

What I claim as new and desire to secure by Letters Patent of the United States is:

1. In a motor control system, the combination with an induction motor having slow and high speed connections, of electro-responsive switch mechanism for establishing power connections to operate the motor at each of said speeds comprising line switch mechanism and speed selective switch mechanism cooperating therewith, master switch mechanism for controlling the energization of said electro-responsive switch mechanism, an automatic switch arranged to be closed upon the operation of said motor at high speed, and connections jointly controlled by said switch and said selective switch mechanism for maintaining said line switch mechanism energized independently of said master switch upon the establishment of the slow speed power connection of the motor after operation thereof at high speed.

2. In a motor control system, the combination of an electric motor arranged to be operated at a plurality of definite speeds, electro-responsive switch mechanism operable to establish power connection for operating the motor at each of said speeds comprising normally open line switch mechanism and speed selective switch mechanism co-operating therewith and biased to establish a slow speed connection of the motor, master switch mechanism for controlling the energization of said electroresponsive switch mechanism, time delay switch mechanism for maintaining said line switch mechanism energized to establish a slow speed power connection of the motor independently of the operation of said master switch mechanism to stop the motor from a higher speed operation thereof, and connections controlled by said selective switch whereby upon operation of said master switch mechanism to stop the motor from a higher speed operation thereof and the failure of said selective switch to establish the slow speed power connections of the motors, the said line switch is automatically de-energized independently of said time delay switch mechanism.

3. In a motor control system, the combination with an induction motor having slow and high speed connections, of electroresponsive switch mechanism for controlling the connection of the motor to a source of power for slow and high speed operation thereof comprising a selective switch and a line switch, said selective switch being biased to establish the slow speed connections of the motor and operable to establish the high speed connections of the motor and said line switch being biased to the open position and operable to the closed position, master switch mechanism for controlling the operation of said electroresponsive switch mechanism, a relay connected to be energized upon the operation of said selective switch to establish the high speed connections of the motor and arranged to maintain said line switch closed independently of said master switch mechanism, and time delay means set into operation upon the return of said selective switch to its biased position for de-energizing said relay after a predetermined time interval.

4. In a motor control system, the combination with an induction motor having slow and high speed connections, of switch mechanism operable to establish power connections for slow and high speed operation of the motor and to stop the motor, resistors in circuit with the slow speed power connections of the motor, electroresponsive time delay means set into operation upon the establishment of the slow speed power connections of the motor for short circuiting said resistors, an electroresponsive relay connected to be energized during high speed operation of the motor, and connections whereby said relay and said time delay means cooperate to establish the slow speed power connections of the motor for a predetermined time interval upon the operation of said switch mechanism to stop the motor from high speed operation thereof.

5. In a motor control system, the combination with an induction motor having slow and high speed connections, of resistors in circuit with the slow speed connections of the motor, a controller and electroresponsive switch mechanism controlled thereby for connecting the motor to a source of power for slow and high speed operation thereof in either direction, said switch mechanism including time delay means for short circuiting said resistors a predetermined time interval after the establishment of the slow speed power connections of the motor, a relay connected to be energized upon establishment of the high speed power connections of the motor, and arranged to automatically control said electroresponsive switch mechanism to effect the establishment of the slow speed power connections of the motor after operation thereof at high speed in either direction, and auxiliary switch mechanism associated with said time delay means and connections controlled thereby whereby the energizing circuit of said relay is interrupted upon the operation of said means to short circuit said resistors.

6. In a motor control system, the combination with an induction motor having slow and high speed connections, of an electromagnetic selective switch for controlling said connections, said switch being biased to establish the slow speed connections of the motor and operable to establish the high speed connections thereof, electromagnetic switch mechanism biased to the open position and operable to the closed position to cooperate with said selective switch in connecting the motor to a source of power, master switch mechanism for controlling the energization of said selective switch and said electromagnetic switch mechanism to establish the slow and high speed power connections of the motor and to interrupt the same, resistors in circuit with the slow speed power connections of the motor, electroresponsive time delay switch mechanism for controlling said resistors, connections jointly controlled by said selective switch and said electromagnetic switch mechanism for energizing said time delay switch mechanism to short circuit said resistors a predetermined time interval after the establishment of the slow speed power connections of the motor, an electroresponsive relay biased to the open position, connections jointly controlled by said selective switch and said time delay switch mechanism for energizing said relay upon the establishment of the high speed power connections of the motor, and connections jointly controlled by said relay and said selective switch whereby the said electromagnetic switch mechanism is maintained energized for a predetermined time interval after operation of said master switch mechanism to interrupt both the slow and high speed power connections of the motor during high speed operation thereof.

In witness whereof, I have hereunto set my hand this 9th day of September, 1924.

JOHN EATON.